United States Patent
Poon et al.

(10) Patent No.: US 10,967,317 B2
(45) Date of Patent: Apr. 6, 2021

(54) FILTER ASSEMBLY WITH CURVED INLET GUIDE

(71) Applicant: W. L. Gore & Associates, Inc., Newark, DE (US)

(72) Inventors: Wai Sing Poon, Hockessin, DE (US); Thomas P. Kelmartin, West Chester, PA (US); Vineet Rakesh, Garnet Valley, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 520 days.

(21) Appl. No.: 15/239,250

(22) Filed: Aug. 17, 2016

(65) Prior Publication Data
US 2017/0050136 A1    Feb. 23, 2017

Related U.S. Application Data

(60) Provisional application No. 62/206,397, filed on Aug. 18, 2015.

(51) Int. Cl.
| | | |
|---|---|---|
| *B01D 46/00* | (2006.01) | |
| *B01D 46/12* | (2006.01) | |
| *B01D 46/52* | (2006.01) | |

(52) U.S. Cl.
CPC ..... *B01D 46/0005* (2013.01); *B01D 46/0041* (2013.01); *B01D 46/125* (2013.01); *B01D 46/521* (2013.01); *B01D 46/0047* (2013.01)

(58) Field of Classification Search
None
See application file for complete search history.

(56) References Cited

U.S. PATENT DOCUMENTS

| | | | | |
|---|---|---|---|---|
| 3,422,602 A | * | 1/1969 | Janson | B01D 46/02 55/378 |
| 3,524,304 A | * | 8/1970 | Deutschmann | B01D 46/02 55/374 |
| 3,953,566 A | | 4/1976 | Gore | |
| 4,300,927 A | * | 11/1981 | Day | B01D 46/023 55/378 |
| 5,298,044 A | * | 3/1994 | Sutton | B01D 46/0002 55/378 |
| 5,554,203 A | | 9/1996 | Borkent et al. | |

(Continued)

FOREIGN PATENT DOCUMENTS

| | | |
|---|---|---|
| DE | 1507762 | 4/1969 |
| FR | 1550609 | 12/1968 |

(Continued)

OTHER PUBLICATIONS

International Search Report and Written Opinion for Application No. PCT/US2016/047550 dated Nov. 29, 2016.

*Primary Examiner* — Christopher P Jones
*Assistant Examiner* — Brit E. Anbacht
(74) *Attorney, Agent, or Firm* — Greenberg Traurig, LLP

(57) ABSTRACT

A cassette filter assembly for removing particles from an air stream, in particular from a gas stream entering a gas turbine, has an upstream end and a downstream end and comprises a header frame to which a filter media is fitted and which has an inlet guide on said mounting face, the inlet guide having a plurality of openings, each opening being defined by a pair of lofted short sides and a pair of lofted long sides.

15 Claims, 5 Drawing Sheets

(56) References Cited

U.S. PATENT DOCUMENTS

| | | | |
|---|---|---|---|
| 7,501,003 B2 | 3/2009 | Muller et al. | |
| 8,372,181 B2* | 2/2013 | Davies | B01D 46/023 |
| | | | 95/273 |
| 8,720,028 B2* | 5/2014 | Singh | B01D 46/002 |
| | | | 29/402.08 |
| 8,870,994 B2* | 10/2014 | Herrmann | F02C 7/052 |
| | | | 55/484 |
| 9,205,359 B2 | 12/2015 | Kelmartin et al. | |
| 2003/0106294 A1* | 6/2003 | Chung | B01D 39/086 |
| | | | 55/486 |
| 2011/0079553 A1* | 4/2011 | Thomson | B01D 39/1623 |
| | | | 210/489 |
| 2013/0062276 A1 | 3/2013 | Barreteau et al. | |
| 2015/0219010 A1 | 8/2015 | Santini | |
| 2016/0096134 A1* | 4/2016 | Santini | B01D 46/0023 |
| | | | 55/302 |
| 2018/0133632 A1* | 5/2018 | Tripp | B01D 39/1623 |

FOREIGN PATENT DOCUMENTS

| | | |
|---|---|---|
| JP | 1968010577 | 9/1964 |
| JP | 1986079620 | 5/1986 |
| JP | 1987039817 | 3/1987 |
| JP | 2008542006 | 11/2008 |
| WO | WO-2006126937 A1 | 11/2006 |
| WO | WO-2013/185878 A1 | 12/2013 |
| WO | WO-2014/058692 A1 | 4/2014 |

\* cited by examiner

FILTER ASSEMBLY WITH CURVED INLET GUIDE

CROSS-REFERENCES TO RELATED APPLICATIONS

This patent application claims priority from U.S. Provisional Application Ser. No. 62/206,397, entitled "Filter Assembly With Curved Inlet Guide," filed Aug. 18, 2015, the disclosure of which is incorporated herein by reference in its entirety.

FIELD OF INVENTION

The present invention relates to filter apparatus, and more particularly, to air intake filters utilized in industrial applications. The present disclosure may be used in filtration units used in a variety of applications, such as in emergency power generators, gas turbine, gas compressors, HVAC systems, gas mining operations, and the like.

BACKGROUND

Filters are employed in a wide range of applications, from usages to filter intake air in building ventilation systems to large scale industrial facilities and equipment. By way of example, air intake filters are utilized in connection with gas turbine combustion systems employed for power generation.

In such applications high volumes of air are utilized in the combustion process. In turn, high volume filtration apparatus are necessary to condition intake air streams for combustion optimization and for reducing wear on componentry. In this regard, it is desirable for such filter apparatus to provide for relatively high volume gas filtration with relatively low pressure drop while providing reliable removal of particles and liquid from the intake air. In particular, in gas turbine applications, the removal of relatively small particles and liquid droplets is desirable to minimize degradation of turbine componentry (e.g., corrosion of compressor blades) and loss of compressor efficiencies. As may be appreciated, replacement of turbine componentry is not only expensive, but may also entail significant down time.

In order to realize high volume air filtration, cassette filters in the form of V-panel filters are often employed. In V-panel filters, adjacent filter packs are generally oriented at acute angles to define a V-shaped configuration along and across an airstream. The V-panel filter is referred as cassette filter hereto.

The aforementioned applications have in common that they require a large amount of air to be filtered with high particle filtration efficiency. In some applications, a single cassette filter has the capacity for filtering more than 1000 $m^3$ per hour, with a typical filter size of 600 mm×600 mm×300 mm or 600 mm×600 mm×400 mm (length×width×depth) filtering about 2,500 $m^3$ to 5,000 $m^3$ per hour. Many cassette filters may be used in parallel in order to filter an amount of air of more than 10,000 $m^3$ per hour or even more than 1,000,000 $m^3$ per hour. In such applications, cassette filters or cassettes are mounted in a partition which separates an upstream volume generally referred to as the "dirty air section" from a downstream volume generally referred to as the "clean air section". The partition may be in the form of a wall with openings in which the cassette filters are mounted or may be in the form of a rack defining a plurality of openings in which the cassette filters are mounted so as to create a substantially airtight partition between the dirty air and clean air sections.

Many installations have limited space due to obstructions or installed equipment. Such constraints limit the depth to which the cassette filter can extend into the clean side, and has therefore limited the size of cassette filters. The size limitation limits the amount of media that can be installed in a filter. This problem is particularly acute when retrofitting existing filter systems with high efficiency media. High efficiency media often has increased pressure drop, making it particularly important to maximize filter area when retrofitting existing filtration systems.

The size and weight of the inlet filtration system is a critical factor in some systems, for example, offshore platform. There is an industry trend to reduce size and weight by designing more compact filter housings. The smaller footprint results in fewer filters in the housing and therefore higher airflow per filter and pressure drop. To keep a lower pressure drop, more filter media is deployed by extending the length of the filter. However, the face area of the filter area remains the same. The restriction from the narrow openings in the filter header frame increases significantly at high flow rate, 6,000 $m^3/h$ or more per filter. Pressure drop has a negative impact on engine performance. As a general rule, every 250 Pa increase of inlet pressure drop results in 0.4% penalty in engine power output and 1.67% increase in heat rate.

Cassette filters typically comprise a plurality of filter packs arranged so that pairs of panel filters form V-shapes extending from the cassette filter's upstream end to the cassette panel filter's downstream end. Each filter panel is composed of multiple pleats of filter media extending generally parallel to the overall filtration path, so that air or gas to be filtered passes through the pleats in a generally straight manner. The filter packs are mounted in a casing and are sealed to a header frame at one end of the filter. The header frame provides a mounting face for mounting the cassette filter to a corresponding mounting face of the partition so that the cassette filter extends into and through the opening of the partition into the clean air section. Filter cassettes may be accessed from the dirty air section side and may be easily removed and replaced.

In addition, many applications now require filters to have the capacity to filter extremely large volumes of air—in some cases, 6,000 $m^3$/hour or more for each filter. Such high flow rates dramatically increase the pressure drop across the filter. Efficient filtration requires minimizing this pressure drop.

A known attempt to minimize pressure drop involves the use of an inlet guide placed over the header frame. The known inlet guide has a plurality of openings each having circular surface on the long sides to help manipulate the air flow and reduce pressure drop. While effective to some degree, even greater reduction of pressure drop in high flow rate applications is desirable.

SUMMARY OF THE INVENTION

In one aspect, a filter cassette assembly for mounting onto a partition is provided having a filter cassette having a frame and a plurality of filter media pleat packs disposed within the frame, the filter cassette having an upstream end and a downstream end and a header frame adjacent to the upstream end of the filter cassette, the header frame having a mounting face adapted for mounting the filter cassette, and an inlet guide attached with the header face, the inlet guide having a plurality of openings, each opening being defined by a pair of lofted short sides and a pair of lofted long sides. Preferably, the filter cassette has a pressure drop of less than 500 Pa, preferably less than 300 Pa at 6,400 m³/hour and a removal efficiency class of Filter class E10 or greater according to the test standard EN 1822-2009 Part 5. Also preferably, the flat sheet area of the filter media is greater than 30 m², more preferably greater than 40 m² and 50 m², and the filter cassette extends less than 1000 mm into the clean side of the filtration unit. Also preferably, the short sides of the inlet guide openings have a curved surface, where the curved surface is selected from a group consisting short elliptical, long elliptical, and circular curves. Preferably, the filter cassette has at least one, and more preferably, two, three, or four (or more), pairs of filter pleat packs arranged in V-shaped form. In some cases, the inlet guide and the filter cassette may be removably connected. In other cases, the inlet guide and the filter cassette may be permanently attached, or may be integrally connected.

In another aspect, the inlet guide is provided for attachment to a filter cassette. The inlet guide has openings configured to align with openings of a filter cassette, and each opening has a pair of long sides and a pair of short sides, each side having a lofted or curved surface. In some cases, the lofted or curved surfaces can be selected from a group comprising short elliptical, long elliptical, and circular curves.

In another aspect, a filtration unit is provided that incorporates the filter cassette described above. In various embodiments, the inlet guide may be removably attached with the header face of the filter cassette or may be integrally attached with the header face.

In another aspect, there is provided a method of installing a filter of the cassette filter type in which the cassette filter includes a header frame for attachment to a partition and in which the cassette filter includes a mounting flange adjacent to the inlet side of the cassette filter. In some cases, an inlet guide can be attached with the mounting face, the inlet guide having a plurality of openings each having lofted long sides lofted short sides. In some other cases, the inlet guide can be positioned so that it is aligned with the cassette filter, and can be attached with the partition such that the inlet guide is adjacent and aligned with the mounting face of the cassette filter.

In another aspect, there is provided a method of flowing air into a filter assembly in which an inlet guide is attached with a filter cassette and the inlet guide is attached therewith at the upstream end of the filter cassette. Flowing the air through the inlet guide provides for a reduction in the pressure drop across the filter assembly. In some cases, an outlet guide may be provided, which can also provide for a reduction in the pressure drop across the filter assembly. The method can include passing air through a plurality of openings in the inlet guide so that a pressure drop across the total assembly of the inlet guide and cassette is reduced by the inlet guide. In particular, the flow of air can be passed through the plurality of openings and past respective pairs of lofted and/or curved long sides and short sides defining the openings, such that circulation in the air upstream of the filter cassette is reduced as it flows into the filter cassette. The method can further include passing air from a downstream end of the filter cassette and past an outlet guide that includes a plurality of outlet guide elements effective to reduce circulation of the flow of air downstream of the filter cassette. The methods of flowing air can include reducing the pressure drop across the total assembly of the filter cassette and inlet guide, such that the pressure drop for a filter of Filter class E10 or greater is reduced to below 500 Pa when the flow of air is 6,400 m³/h or more.

BRIEF DESCRIPTION OF THE DRAWINGS

FIG. 3A shows an example of a short elliptical curve surface.
FIG. 3B shows an example of a long elliptical curve surface.
FIG. 3C shows an example of a semicircular curve surface.
FIG. 3D shows an example of a triangular surface in lieu of a curve surface.
FIG. 4A shows an example of a short elliptical short side.
FIG. 4B shows an example of a long elliptical short side.
FIG. 4C shows an example of a circular short side.
FIG. 4D shows an example of a triangular short side.

Figure 1:
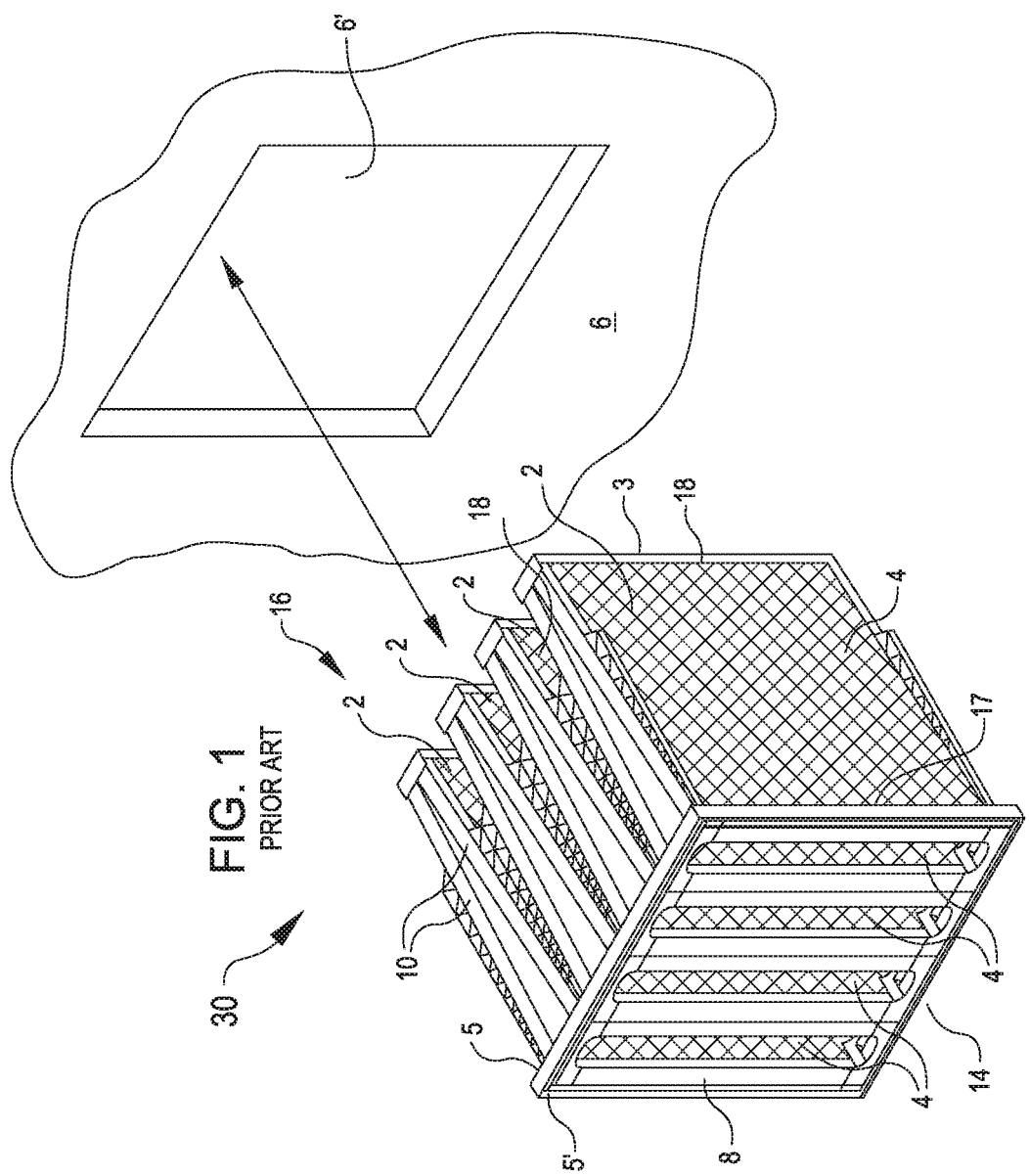
FIG. 1 is a perspective view of a prior art cassette filter.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives thereof.

DETAILED DESCRIPTION

The cassette filter used in embodiments of the disclosure described has an upstream end and a downstream end and comprises a frame to which a filter media pleat pack is fitted and which has a header frame adapted for mounting the cassette filter to an opening of a partition, as described hereinbefore in relation to the prior art.

FIG. 1 shows a prior art filter arrangement with a cassette filter 1 mounted in an opening of a partition 6. The partition 6 shown here has the form of a wall. The partition defines a plane which separates a clean air section upstream of the upstream end 14 of the cassette filter 1, from a dirty air section at the downstream end 16 of the cassette filter 1. The cassette filter 1 is composed of a plurality of filter pleat packs 2. The filter pleat packs 2 are set in the cassette filter 1 in a V-shaped arrangement extending in an upstream-to-downstream direction, so that air enters between facing filter pleat packs. The pleat packs 2 are interconnected alternately at their upstream and downstream ends. The connection at the upstream end 14 is in the form of a header frame 8. The header frame 8 projects laterally so as to form a mounting face 5 on its downstream side. The mounting flange 5' surrounds the filter panel package so that the cassette filter 1 can be mounted through a void 6' in the partition 6 via the header frame 8 in a substantially air tight manner wherein the mounting face 5 has a sealing function.

When air to be cleaned passes through the cassette filter 1, it enters the cassette filter 1 through the openings in the header frame 8, passes through the filter media 4 of the filter pleat packs 2 from the upstream surface side 17 thereof to the downstream surface side 18 thereof and exits the cassette filter 1 from the cassette filter's downstream end 16. Side walls 10 provide the strength necessary to maintain the desired V-bank arrangement of the filter packs 2 and force the air to be cleaned to pass through the filter pleat packs 2; and end caps 3 secure and seal the ends of the filter packs together.

U.S. Pat. No. 9,205,359 titled "V-Panel Filter" describes a V panel filter construction method that includes flowing curable potting material into a recess portion of an end cap, positioning first end edge surfaces of first and second filter packs into the contained potting material, and curing the potting material with the first and second filter packs positioned to diverge away from the end cap to define a V shaped configuration. By utilizing the pot and place sealing methodology, improved seal interfaces are realized. Additionally stability and construction advantages may be provided by snap fit features of the header member to secure the side plates.

A typical cassette filter of FIG. 1 would have a depth of about 300 mm or about 400 mm or about 610 mm and would have a filter frame of typically 592 mm×592 mm or 610 mm×610 mm (height×width). The filter header frame (refer to diagram) may have a thickness of about 20 mm. Typically, three or more pairs of filter pleat packs 2 are arranged in V-shaped form (heretofore referred as "V") in the filter cassette.

Figure 2:
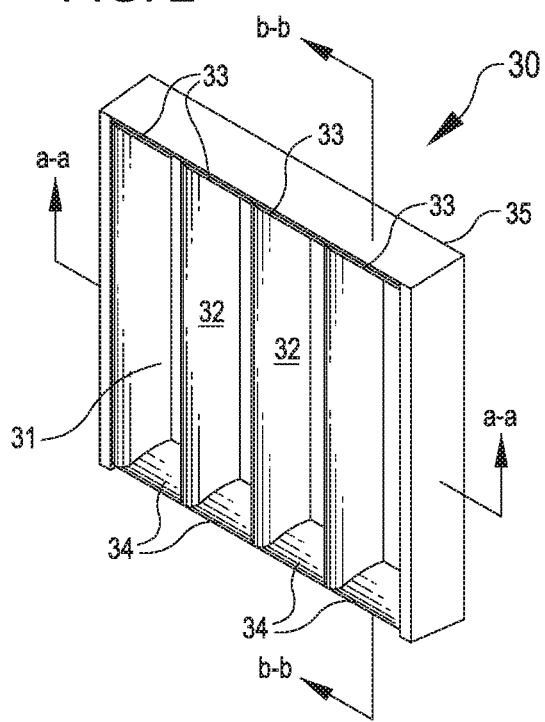
FIG. 2 is a perspective view of an inlet guide according to an exemplary embodiment of the present disclosure.

FIG. 2 illustrates an embodiment of the present disclosure. FIG. 2 shows an inlet guide 30 having a plurality of openings 31 to provide for air inlet management. Each opening 31 has long sides 32, and short sides 33 and 34. As the air flows through opening 31, use of lofted curve surface for long sides 32 decreases the pressure drop across the filter. In one embodiment, the long sides 32 may have a height, depending on the filter, that ranges from 5 to 500 mm, e.g., from 10 to 250 or from 25 to 75 mm. Examples of curved surfaces include, but not limited to short elliptical shown in FIG. 3A, long elliptical shown in FIG. 3B and circle shown in FIG. 3C. Alternatively long sides may include a lofted straight surface as shown as a triangle in FIG. 3D. It should be understood that the FIGS. 3A-3D maintain a similar opening distance of opening 31 between adjacent sides 32 and that this opening distance does not vary depending on the shape factor.

Figure 4A:
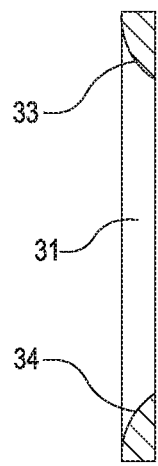
FIGS. 4A-4D show views of cross section b-b of various lofted short sides of the inlet guide of the cassette filter as shown in FIG. 2.
Figure 4B:
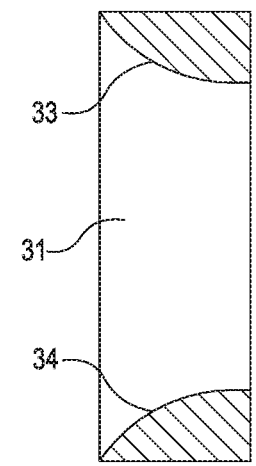
Figure 4C:
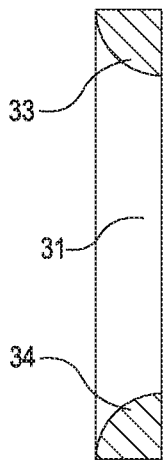
Figure 4D:
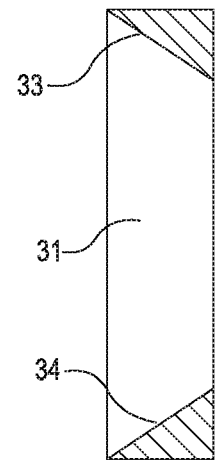

Unlike with prior art devices, short sides 33 and 34 of each opening in the embodiment of FIG. 2 has a lofted curve surface as shown FIGS. 4A, 4B, and 4C. In the illustrated embodiment, short sides 33 and 34 have a 25 mm height, but other lengths of curves are used in alternative embodiments (such as 75 mm height). It should be understand that the short sides 33 and 34 height may depend on the filter and may be from 5 to 500 mm, e.g., from 10 to 250 or from 25 to 75 mm. The curve of short sides 33 and 34 as shown faces inward toward the center of the opening where the air passes through. The curve surface along the flow direction results in smooth transition of the airflow into the entrance of the V, as opposed to abrupt contraction on the flat header 8. Examples of lofted curved surfaces include, but not limited to short elliptical shown in FIG. 4A, long elliptical shown in FIG. 4B and circle shown in FIG. 4C. In another embodiment of the present invention short sides 33 and 34 may be lofted straight surface as shown as a triangle in FIG. 4D. Varying shape factor of short sides 33 and 34 has a significant impact of pressure drop. It should be understood that the FIGS. 4A-4D maintain a similar opening distance of opening 31 between short sides 33 and 34 and that this opening distance does not vary depending on the shape factor.

The loft curve is characterized by the height to width ratio. In one embodiment, the ratio is 1 to 2.7. In another embodiment, the ratio is 1 to 1. Various loft curves are possible to form circular, elliptical, or triangular shape for the inlet and outlet guides as shown in FIG. 3A-D. As shown in FIG. 4A-D, only half the profile is needed to streamline the air flow for the outer long sides and short sides.

The inlet guide 30 can be constructed to accommodate attachment with a preexisting cassette filter 1, particularly a preinstalled cassette filter that is already positioned within an industrial system. In particular, the inlet guide 30 may be constructed to be readily installed without first detaching a cassette filter 1 from an industrial system. In some cases, the inlet guide 30 may include attachment features for accommodating tool-less installation, e.g. by providing elastically deforming snap-fit connectors that attach or "clip" the inlet guide 30 onto the flat header 8 of the cassette filter 1. For example, the frame 35 of the inlet guide 30 may be configured to snap around the flange 5' of the mounting face 5.

In some embodiments, the connectors can connect into the openings in the header frame 8. In other embodiments, the connectors can connect around the header frame 8. In some embodiments, clamps or external clips may be provided around a periphery of the header frame 8 and the inlet guide 30 for attaching the inlet guide with the header frame. In alternative embodiments, the inlet guide 30 may be attached with the header frame 8 by way of additional connectors employing minimal tool use: for example, the inlet guide 30 may be attached with the header frame 8 by way of screws, rivets, bolts, or similar elements passed through portions of the inlet guide and header frame. The inlet guide 30 may optionally be welded to the header frame 8.

Inlet guide 30 is constructed of any material of suitable structural integrity, such as metal or plastic. Where possible, i.e. when the inlet guide 30 is a plastic such as a thermoform or thermoset plastic, the inlet guide 30 may be molded as a single part, including the shaped long and short sides 32, 33, 34, openings 31, and any suitable connecting features. In some cases, the inlet guide 30 may be subjected to post-forming steps, which can include punching out the openings 31. Suitable polymer materials can include ABS, polystyrene or any suitable injection moldable or thermoform polymers. Where the inlet guide 30 is constructed of metal, such as sheet metal, the shaped long and short sides 32, 33, 34 can be formed by way of deformation in a press; and the openings 31 may be punched out prior to or subsequent to the deformation step. Where the long sides 32 and the short sides 33, 34 meet, they generally fuse along a smooth arc, but in some cases, the transition may be rounded or smoothed.

The inlet guide described in connection with the figures above is a separate part designed to be attached to the header of a filter housing. Alternatively, the inlet guide is constructed integrally with the filter frame assembly, such that a combined filter guide with an inlet guide as described above can be installed in an industrial facility as a single piece. In some embodiments, the frame 35 of the inlet guide 30 can include features for connecting the filter frame assembly and inlet guide as a unit to a partition 6. For example, the frame 35 of the inlet guide 30 can comprise a flange extension for connecting with the header 8.

Figure 5:
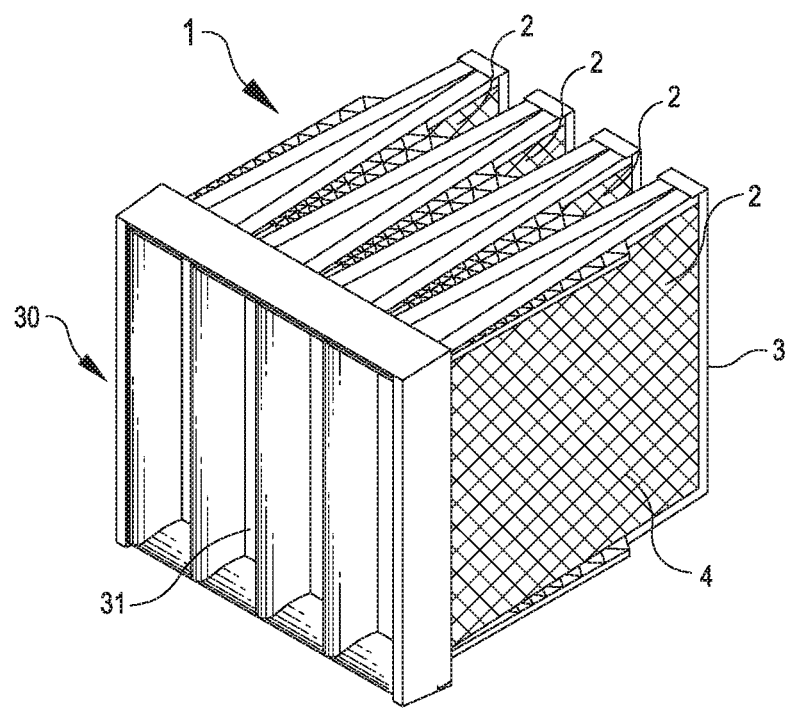
FIG. 5 is a perspective view of a cassette filter with an inlet guide according to an exemplary embodiment of the present disclosure.

FIG. 5 shows an exemplary embodiment of the present disclosure, inlet guide 30 is mounted on cassette filter 1 comprising of a plurality of filter pleat packs 2 having a V-shaped arrangement. Any of the configurations described in FIGS. 3A-D and 4A-D and combination thereof may be configured as the inlet guide 30 mounted to cassette filter 1. The openings 31 in the inlet guide 30 are in general alignment with the filter pleat packs 2. As described herein, each opening 31 defined by a set of long sides and a set of short sides, the plurality of openings running parallel to the set of long sides. The long sides and short sides have lofted surfaces, which provide an advantage of reducing the pressure drop of the filter pleat pack.

Figure 6:
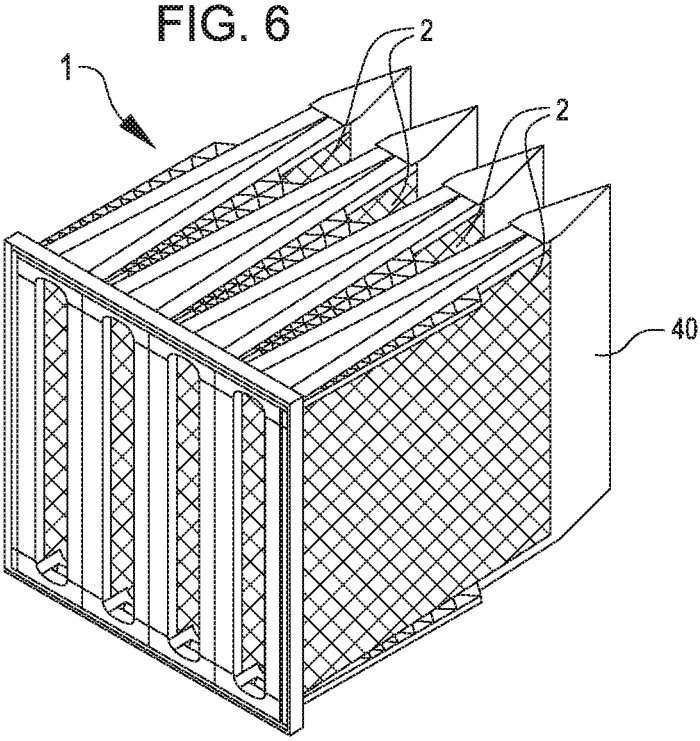
FIG. 6 is a perspective view of a cassette filter with an outlet guide according to an exemplary embodiment of the present disclosure.

FIG. 6 shows an exemplary embodiment of an outlet guide, in accordance with some aspects of this disclosure. An additional pressure drop is associated with the abrupt flow area enlargement at the exit section of the cassette on the "clean side." A gradual increase in the flow cross-section would facilitate reduction of this pressure drop. Based on computational studies, it was determined that a triangular, elliptical, or lofted curve-shaped "outlet guide" reduced this pressure. As shown in FIG. 6 the outlet guide 40 can be constructed as an attachment, or it can be integrated with the filter frame 1 to achieve a reduction in pressure drop. For example, in some cases, the outlet guide 40 may be configured to attach, e.g. by way of a snap or slotted connection, with the pleat packs 2 of a filter frame 1. In some other cases, the outlet guide 40 may be permanently or semi-permanently attached with the filter frame 1, e.g. by way of adhesive or by mechanical connection with screws, rivets, bolts, or similar connectors. The outlet guide 40 may in some cases be readily attachable with the end caps 3 of the filter frame 1; or may entirely replace the end caps.

Figure 3A:
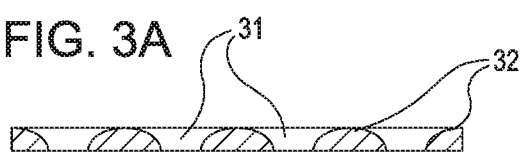
FIGS. 3A-3D show views of cross section a-a of various full loft curve surfaces for the long sides of the inlet guide of the cassette filter as shown in FIG. 2.
Figure 3B:
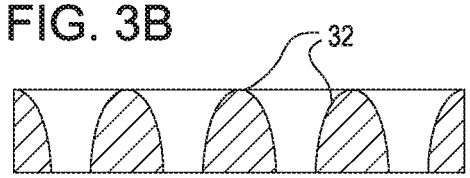
Figure 3C:
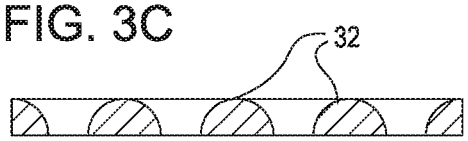
Figure 3D:
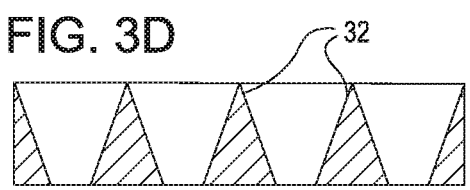

The outlet guide 40 can include a plurality of outlet guide elements, each element disposed at the downstream end 16 of the filter frame 1. The outlet guide 40 can adopt any of the suitable shapes described above with reference to the long sides 32 of the inlet guide 30 shown in FIGS. 2 and 3A-3D. For example, the outlet guide 40 can adopt a shortened elliptical construction as illustrated by FIG. 3A, a lengthened elliptical construction as shown in FIG. 3B, a circular construction as shown in FIG. 3C, or a triangular construction as shown in FIG. 3D. The outlet guide 40 can be constructed of any suitable material, including, for example, structural metals or plastics as described above with reference to the inlet guide 30.

Figure 7:
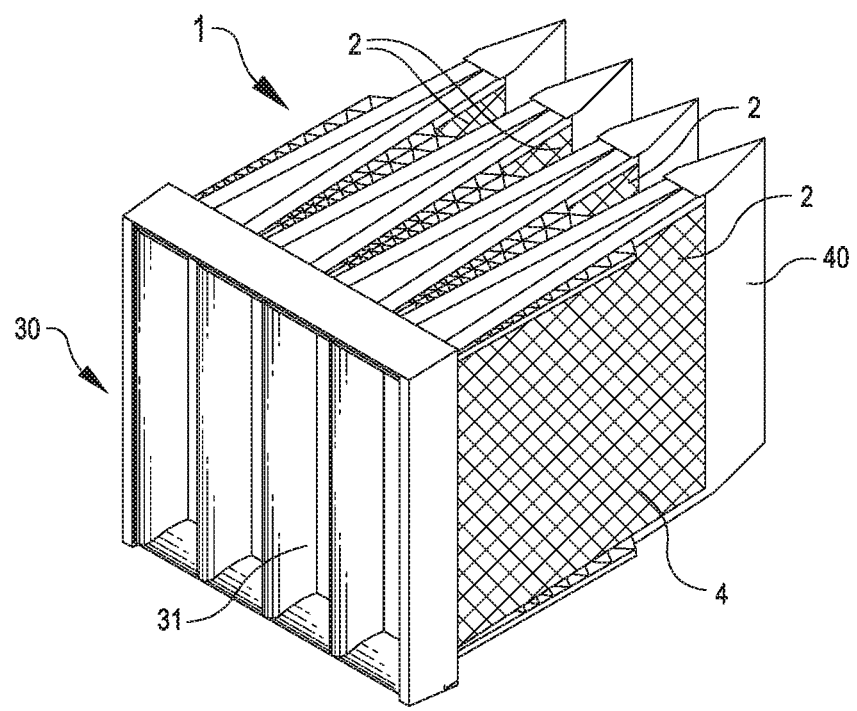
FIG. 7 is a perspective view of a cassette filter with inlet and outlet guides according to an exemplary embodiment of the present disclosure.

FIG. 7 shows another embodiment of present invention having both an inlet guide 30 and outlet guide 40 mounted on the cassette filter 1 as described herein.

The filter media 4 of the filter media pleat packs 2 may have pleats in an orientation that is parallel to the airflow from upstream to downstream. However, the pleats may run in any direction. For example, the pleat may run perpendicular to the upstream-to-downstream flow. The filter media 4 may comprise cellulose or glass fibers or synthetic materials such as polyester non-woven or polypropylene non-woven. It is particularly preferred to use a composite filter media having at least two superposed filtration layers, one of which preferably is a membrane filtration layer and the other is a prefiltration layer. The prefiltration layer may comprise nano fibers, glass fibers, or non-woven fibrous polymeric web, such as a spun bond, meltblown, fiberglass, microfiberglass, and cellulose or microporous membrane. Preferably the prefiltration layer is a melt blown web. The melt blown polymer fiber web layer or layers can be made from a variety of polymeric materials, including polypropylene, polyester, polyamide, polyvinylchloride, polymethylmethacrylate and polyethylene, among which polypropylene is the most preferred. Typically, the polymer fibers that form the web have a diameter in the range of about 0.05 µm to about 10 µm, preferably about 1 µm to about 5 µm.

Preferably, at least one depth filtration media is formed as an electret filter media comprising a highly efficient layer having an electrostatic charge. Electric charge is imparted to the melt blown fibers to improve their filtration performance using a variety of known techniques. Downstream of the composite filter media's depth filtration layer or layers is disposed the membrane filtration layer which is intended to capture particles that pass through the depth filtration layer. A variety of microporous polymeric membranes can be used as the membrane filtration layer, depending on the requirements of the application. The membrane filtration layer may be constructed from the following exemplary materials: nitrocellulose, triacetyl cellulose, polyamide, polycarbonate, polyethylene, polypropylene, polytetrafluoroethylene, polysulfone, polyvinylidene fluoride, acrylate copolymer. The membrane filtration layer is preferably constructed from a hydrophobic material that is capable of preventing the passage of liquids. Exemplary filtration materials are described in U.S. Pat. No. 7,501,003. Preferably, the membrane filtration layer is a microporous fluoropolymer, such as an ePTFE, fluorinated ethylene propylene (FEP), perfluoroalkoxy polymer (PFA), polypropylene (PP), polyethylene (PE) or ultrahigh molecular weight polyethylene (PE-UHMW). Particularly suitable ePTFE membranes are described in U.S. Pat. No. 3,953,566. For further information on suitable materials, their properties and corresponding test methods reference is made to U.S. Pat. No. 3,953,566.

EXAMPLES

The inlet guides described above were assembled and determined to greatly reduce the pressure drop across the total assembly of the inlet guide 30 and cassette filter 1 when exposed to operating conditions. Unlike conventional baffles or vanes, the long sides 32 are not purposed for protecting the inlet or changing direction of the flow of air. Rather, the shaped long sides 32 extending away from the cassette filter 1 enhance the flow characteristics of air as it enters the cassette filter. In particular, the inlet guide 30 functions to reduce the circulation and eddies in the air incident on the face of the inlet guide, as compared to the circulation and eddies that occur proximate to a bluff face such as the header frame 8. Unexpectedly, the provision of similarly curved surfaces at the short sides 33, 34 further reduced the pressure drop across the cassette filter by a significant margin. In both cases, the pressure drop was decreased despite the fact that the inlet guide 30 exposes a greater surface area to the airflow entering the cassette filter 1. One implication of this unexpected improvement in aerodynamic efficiency is a commercially significant reduction in energy expenditure to pull air through the cassette filter 1. The decrease in pressure drop is discussed below with reference to several examples.

In tests using the inlet guide disclosed herein at higher air flow rates of 6,400 $m^3$/hour and 8,500 $m^3$/hour, the pressure drop was shown to be reduced by about 11% and 13% respectively, compared to 7% and 7% using inlet guides having curved or lofted surfaces only on the long sides of the openings. Specific reductions in the pressure drop across different inlet guide arrangements are shown with reference to Table 1, below, for a cassette filter having filter class E12 according to EN 1822-2009.

TABLE 1

Pressure Drop Characteristics for Lofted Inlet Guides

| | Volume Flow Rates: | |
|---|---|---|
| | 6,400 m³/h | 8,500 m³/h |
| Comparative Example: No Inlet Guide | 316 Pa | 497 Pa |
| Example 1: Circular Shaped Surfaces (Long Sides Only) | 294 Pa | 463 Pa |
| Pressure Drop Reduction | 7% | 7% |
| Example 2: 25 mm Lofted Surfaces | 281 Pa | 430 Pa |
| Pressure Drop Reduction | 11% | 13% |
| Example 3: 75 mm Lofted Surfaces | 279 Pa | 428 Pa |
| Pressure Drop Reduction | 12% | 14% |

Table 1 illustrates that significant pressure drop reductions were achieved with the configurations of lofted inlet guides discussed herein. By way of comparative example, a filter assembly having no added inlet guide had a pressure drop of 316 Pa across the filter at a flow rate of 6,400 m³/h and a pressure drop of 497 Pa across the filter at a flow rate of 8,500 m³/h.

Example 1

The addition of circular shaped long sides 32 (as in the example shown in FIG. 3C, above), even without concomitant addition of circular short sides 33, 34, provided for reduced pressure drops across the entire filter assembly of about 7% for each tested flow rate.

Example 2

The addition of lofted inlet guides of 25 mm, similar to short elliptical long and short sides 32, 33, 34 as shown in FIGS. 3A and 4A, provided even greater reduction in pressure drop across the filter. Both the long sides 32 and short sides 33, 34 were modified in this Example. At the lower volumetric flow rate of 6,400 m³/h, the 25 mm lofted inlet guide provided for a reduction in pressure drop of about 11%; and at the higher volumetric flow rate 8,500 m³/h, the 25 mm lofted inlet guide provided for a reduction in pressure drop of about 13%.

Example 3

The addition of lofted inlet guides of 75 mm, similar to long elliptical long and short sides 32, 33, 34 as shown in FIGS. 3B and 4B, provided similarly promising reduction in pressure drops across the filter. At the lower volumetric flow rate, the 75 mm lofted inlet guide reduced the pressure drop by 12%; and at the higher volumetric flow rate, the 75 mm lofted inlet guide reduced the pressure drop by 14%.

What is claimed is:

1. An inlet guide comprising:
   a plurality of rectangular openings, each opening defined by a set of long sides and a set of short sides, the plurality of openings running parallel to the set of long sides;

wherein each opening comprises a first pair of lofted surfaces facing toward the respective opening of the plurality of openings along each respective set of long sides; and wherein each opening comprises a second pair of lofted surfaces facing toward the respective opening of the plurality of openings along each respective set of short sides, wherein the second pair of lofted surfaces are lofted from a first end of the inlet guide to a second end of the inlet guide;

wherein a cross-sectional area of each opening decreases from the first end of the inlet guide to the second end of the inlet guide;

wherein the inlet guide is configured to be installed directly on a filter cassette; and wherein a height to width ratio of at least one of: the first pair of lofted surfaces or the second pair of lofted surfaces is a ratio in a range of from 1:1 to 1:2.7 that is configured to reduce a pressure drop across the filter cassette to less than 500 Pa, tested with a flow of air passed through the filter cassette at 6,400 m³/hour.

2. The inlet guide of claim 1, wherein each short side comprises a curved surface selected from the group consisting of: short elliptical, long elliptical, and circular curves.

3. The inlet guide of claim 1, wherein each opening of the plurality of openings is sized to match an opening of an inlet of a filter cassette.

4. The inlet guide of claim 1, wherein the inlet guide is attachable with a mounting face of a filter cassette.

5. The inlet guide of claim 1, wherein the inlet guide is connectible with a filter cassette of removal efficiency class of Filter class E10 or greater according to EN 1822-2009.

6. The filter cassette assembly of claim 1, wherein the lofted long sides of each pair of lofted long sides of each of the openings are defined by curved surfaces facing toward respective openings of the plurality of openings.

7. An assembly comprising:
   a filter cassette having a frame and a plurality of filter media pleat packs disposed within the frame, the filter cassette having an upstream end and a downstream end and the filter cassette comprising a header frame adjacent to the upstream end of the filter cassette, the header frame having a mounting face adapted for mounting the filter cassette, and
   an inlet guide attached directly to the header face, the inlet guide having a plurality of rectangular openings, a first end, and a second end, each opening being defined by a pair of lofted short sides and a pair of lofted long sides, wherein the pair of lofted short sides are lofted from a first end of the inlet guide to a second end of the inlet guide;

wherein a cross-sectional area of each opening decreases from the first end of the inlet guide to the second end of the inlet guide wherein a height to width ratio of at least one of: the first pair of lofted surfaces, or the second pair of lofted surfaces is a ratio in a range of from 1:1 to 1:2.7 that is configured to reduce a pressure drop across the filter cassette to less than 500 Pa, tested with a flow of air passed through the filter cassette at 6,400 m³/hour.

8. The filter cassette assembly of claim 7, wherein the inlet guide is removably attachable with the header face.

9. The filter cassette assembly of claim 7, wherein the inlet guide is integrally attached with the header face.

10. The filter cassette assembly of claim 7, wherein the filter cassette has a removal efficiency class of Filter class E10 or greater according to EN 1822-2009.

11. The filter cassette assembly of claim 7 in which the flat sheet area of the filter media is greater than 30 m² and the filter cassette extends less than 1000 mm into the clean side of a filtration unit.

12. The filter cassette assembly of claim 7 wherein each pair of lofted short sides of each of the inlet guide openings are defined by curved surfaces facing the respective inlet guide openings.

13. The filter cassette assembly of claim 7, wherein each lofted short side and each lofted long side is defined by a curve selected from a group consisting short elliptical, long elliptical, and circular curves.

14. The filter cassette assembly of claim 7 having at least one pair of filter pleat packs arranged in V-shaped form.

15. The filter cassette assembly of claim 7 having at least four pairs of filter pleat packs arranged in V-shaped form.

\* \* \* \* \*